United States Patent
Takahashi et al.

(10) Patent No.: US 11,196,083 B2
(45) Date of Patent: Dec. 7, 2021

(54) SOLID ELECTROLYTE OF LITHIUM SECONDARY BATTERY AND SULFIDE COMPOUND FOR SAID SOLID ELECTROLYTE

(71) Applicant: Mitsui Mining & Smelting Co., Ltd., Tokyo (JP)

(72) Inventors: Tsukasa Takahashi, Ageo (JP); Takashi Chikumoto, Ageo (JP); Takahiro Ito, Ageo (JP); Hideo Uesugi, Hiroshima (JP)

(73) Assignee: Mitsui Mining & Smelting Co., Ltd., Tokyo (JP)

(*) Notice: Subject to any disclaimer, the term of this patent is extended or adjusted under 35 U.S.C. 154(b) by 0 days.

(21) Appl. No.: 16/628,651

(22) PCT Filed: Jul. 2, 2018

(86) PCT No.: PCT/JP2018/025005
§ 371 (c)(1),
(2) Date: Jan. 3, 2020

(87) PCT Pub. No.: WO2019/009228
PCT Pub. Date: Jan. 10, 2019

(65) Prior Publication Data
US 2020/0127325 A1    Apr. 23, 2020

(30) Foreign Application Priority Data

Jul. 7, 2017   (JP) .................................. 2017-133772

(51) Int. Cl.
*H01M 10/0562* (2010.01)
*H01M 4/134* (2010.01)
(Continued)

(52) U.S. Cl.
CPC ......... *H01M 10/0562* (2013.01); *C01B 25/14* (2013.01); *H01M 4/133* (2013.01);
(Continued)

(58) Field of Classification Search
CPC ...... H01M 4/133; H01M 4/134; H01M 4/386; H01M 4/587
See application file for complete search history.

(56) References Cited

U.S. PATENT DOCUMENTS

| 8,075,865 B2 | 12/2011 | Deiseroth et al. |
| 9,812,734 B2 | 11/2017 | Miyashita et al. |

(Continued)

FOREIGN PATENT DOCUMENTS

| CN | 109690697 A | 4/2019 |
| EP | 3511949 A1 | 7/2019 |

(Continued)

OTHER PUBLICATIONS

Translation of Ukawa et al., "Preparation Procedure of Argyrodite-type Li6PS5X (X=Cl, Br, I) Solid Electrolytes and Their Ionic Conductivity", Symposium on Basic Science of Ceramics, Jan. 2015 (1G18), the Ceramic Society of Japan, 1 page English-language Abstract (Year: 2015).*

(Continued)

*Primary Examiner* — Matthew J Merkling
(74) *Attorney, Agent, or Firm* — The Webb Law Firm

(57) ABSTRACT

As a novel sulfide compound having a low elastic modulus while retaining the high ion conductivity, a sulfide compound for a solid electrolyte of a lithium secondary battery that includes a crystal phase of a cubic argyrodite type crystal structure, and is represented by the compositional formula: $Li_{7-x}PS_{6-x}Cl_yBr_z$, wherein x in the compositional (Continued)

formula satisfies x=y+z and 1.0<x≤1.8, and a ratio (z/y) of the molar ratio of Br to the molar ratio of Cl is from 0.1 to 10.0 is proposed.

15 Claims, 2 Drawing Sheets

(51) Int. Cl.
| | |
|---|---|
| *H01M 10/0525* | (2010.01) |
| *H01M 4/38* | (2006.01) |
| *H01M 4/587* | (2010.01) |
| *C01B 25/14* | (2006.01) |
| *H01M 4/133* | (2010.01) |
| *H01M 4/02* | (2006.01) |

(52) U.S. Cl.
CPC ........... *H01M 4/134* (2013.01); *H01M 4/386* (2013.01); *H01M 4/587* (2013.01); *H01M 10/0525* (2013.01); *C01P 2002/30* (2013.01); *C01P 2002/76* (2013.01); *C01P 2004/03* (2013.01); *C01P 2004/61* (2013.01); *C01P 2004/62* (2013.01); *C01P 2006/40* (2013.01); *H01M 2004/027* (2013.01); *H01M 2300/0068* (2013.01)

(56) References Cited

U.S. PATENT DOCUMENTS

| | | | |
|---|---|---|---|
| 9,899,702 B2 | 2/2018 | Miyashita et al. | |
| 2010/0290969 A1* | 11/2010 | Deiseroth | C01D 15/00 423/300 |
| 2011/0081580 A1 | 4/2011 | Stadler et al. | |
| 2016/0156064 A1* | 6/2016 | Miyashita | H01M 10/0562 429/323 |
| 2016/0293946 A1* | 10/2016 | Ritter | H01M 4/623 |
| 2017/0117547 A1* | 4/2017 | Fanous | H01M 4/364 |
| 2018/0069262 A1* | 3/2018 | Utsuno | H01M 10/0525 |
| 2019/0140313 A1 | 5/2019 | Terai et al. | |
| 2019/0140314 A1* | 5/2019 | Utsuno | H01M 10/0525 |
| 2019/0305371 A1 | 10/2019 | Utsuno et al. | |
| 2020/0006808 A1* | 1/2020 | Utsu | H01B 1/10 |

FOREIGN PATENT DOCUMENTS

| | | |
|---|---|---|
| EP | 3557680 A1 | 10/2019 |
| JP | 2001250580 A | 9/2001 |
| JP | 2010540396 A | 12/2010 |
| JP | 201196630 A | 5/2011 |
| JP | 2013137889 A | 7/2013 |
| JP | 201710936 A | 1/2017 |
| JP | 2017120728 A | 7/2017 |
| JP | 201829058 A | 2/2018 |
| WO | 2015012042 A1 | 1/2015 |
| WO | 2016104702 A1 | 6/2016 |
| WO | 2018164224 A1 | 9/2018 |

OTHER PUBLICATIONS

Machine Translation of JP2018029058A (Jul. 2020) (Year: 2020).*
Ukawa et al., "Characterization of Argyrodite-type Li6PS5Cl1-xBrx Solid Electrolytes", the Electrochemical Society of Japan, Mar. 2015 (2H08), 2 pages.
Ukawa et al., "Preparation Procedure of Argyrodite-type Li6PS5X (X=Cl, Br, I) Solid Electrolytes and Their Ionic Conductivity", Symposium on Basic Science of Ceramics, Jan. 2015 (1G18), the Ceramic Society of Japan, 1 page (English-language Abstract).

* cited by examiner (a)

(b)

SOLID ELECTROLYTE OF LITHIUM SECONDARY BATTERY AND SULFIDE COMPOUND FOR SAID SOLID ELECTROLYTE

CROSS-REFERENCE TO RELATED APPLICATIONS

This application is the United States national phase of International Application No. PCT/JP2018/025005 filed Jul. 2, 2018, and claims priority to Japanese Patent Application No. 2017-133772 filed Jul. 7, 2017, the disclosures of which are hereby incorporated by reference in their entirety.

TECHNICAL FIELD

The present invention relates to a solid electrolyte of a lithium secondary battery and a sulfide compound capable of being preferably used for the solid electrolyte.

BACKGROUND ART

A lithium secondary battery is a secondary battery having a structure in which lithium is dissolved as an ion from a positive electrode and occluded by a negative electrode through migration in charging, whereas the lithium ion is returned from the negative electrode to the positive electrode in discharging. A lithium secondary battery is widely used as a power source of home electric appliances, e.g., a video camera, portable electronic equipments, e.g., a notebook computer and a mobile phone, electric power tools, and the like due to such characteristics thereof as a large energy density and a long service life, and in recent years, is being applied to large capacity batteries mounted on an electric vehicle (EV), a hybrid electric vehicle (HEV), and the like.

The lithium secondary battery of this type is constituted by a positive electrode, a negative electrode, and an ion conductor layer held between the electrodes, and the ion conductor layer used is generally a separator formed of a porous film, such as polyethylene or polypropylene, impregnated with a non-aqueous electrolytic solution. However, since an organic electrolytic solution containing a combustible organic solvent as a solvent is used as the electrolyte, the structure and material thereof are necessarily improved for preventing volatilization and leakage thereof, and furthermore a safety device for suppressing temperature raise in short circuit is necessarily mounted, and the structure and material thereof are necessarily improved for preventing short circuit.

On the other hand, an all solid lithium secondary battery, which is totally solidified by using a solid electrolyte, can be simplified in the safety device due to the non-use of a combustible organic solvent, and not only the production cost and the productivity thereof can be improved, but also such characteristics can be provided that a high voltage can be obtained by serially stacking in the cell. Furthermore, in the solid electrolyte of this type, none except for Li ion migrates, it is expected that the side reaction caused by the movement of the anion does not occur, and that the safety and the durability are improved.

The solid electrolyte used in the battery of this type is demanded to have higher ion conductivity as much as possible and also demanded to be stable chemically and electrochemically, and examples of the known candidate materials therefor include a lithium halide, a lithium nitride, a lithium oxoate, and derivatives thereof.

Patent literature 1 describes, as sulfide ceramics having high lithium ion conductivity and high decomposition voltage, lithium ion conductive sulfide ceramics that contains $Li_2S$ and $P_2S_5$ as major components, and has a composition of $Li_2S$=82.5 to 92.5 and $P_2S_5$ 7.5 to 17.5 in terms of percentage by mol, and preferably a composition of $Li_2S/P_2S_5$=7 in terms of percentage by mol (compositional formula: $Li_2PS_6$).

Patent literature 2 describes a lithium ion conductive material that is represented by the chemical formula: $Li^+_{(12-n-x)}B'''^{n+}X^{2-}_{(6-x)}Y^-_x$ (wherein $B'''^{n+}$ represents at least one selected from P, As, Ge, Ga, Sb, Si, Sn, Al, In, Ti, V, Nb, and Ta; $X^{2-}$ represents at least one selected from S, Se, and Te; $Y^-$ represents at least one selected from F, Cl, Br, I, CN, OCN, SCN, and $N_3$; and $0 \leq x \leq 2$) and has an argyrodite type crystal structure.

Patent literature 3 describes, as a solid compound that has a high mobility of lithium ion and is capable of being prepared as a single layer, a lithium argyrodite that is represented by the general formula (I): $Li^+_{(12-n-x)}B'''^{n+}X^{2-}_{(6-x)}Y^-_x$, wherein $B'''^{n+}$ is selected from the group consisting of P, As, Ge, Ga, Sb, Si, Sn, Al, In, Ti, V, Nb, and Ta; $X^{2-}$ is selected from the group consisting of S, Se, and Te; $Y^-$ is selected from the group consisting of Cl, Br, I, F, CN, OCN, SCN, and $N_3$; and $0 \leq x \leq 2$.

Patent literature 4 describes, as a novel sulfide solid electrolyte that is capable of significantly enhancing the conductivity as compared to the ordinary solid electrolyte, a sulfide solid electrolyte that has a structural skeleton of $Li_7PS_6$, and has a compositional formula having P partially replaced by Si: $Li_{7+x}P_{1-y}Si_yS_6$ (wherein x is from −0.6 to 0.6, and y is from 0.1 to 0.6).

Patent literature 5 relates to a compound that has a cubic crystal structure in the F-43m space group, and represented by the compositional formula: $Li_{7-x}PS_{6-x}Ha_x$ (wherein Ha represents Cl or Br), and describes, as a sulfide solid electrolyte for a lithium secondary battery that is capable of increasing the lithium ion conductivity and decreasing the electron conductivity, so as to enhance the charge and discharge efficiency and the cycle characteristics, a sulfide solid electrolyte for a lithium secondary battery that has x in the compositional formula of from 0.2 to 1.8, and a luminance L* in the L*a*b* color space of 60.0 or more.

Patent literature 6 relates to a sulfide solid electrolyte compound for a lithium secondary battery that has a cubic argyrodite type crystal structure, and describes, as sulfide solid electrolyte compound for a lithium secondary battery that is capable of suppressing the generation amount of hydrogen sulfide even when touching the air, and is capable of retaining the high conductivity even when allowing to stand in the dry air, a sulfide solid electrolyte compound for a lithium secondary battery that is represented by the compositional formula: $Li_{7-x+y}PS_{6-x}Cl_{x+y}$ (wherein x and y satisfy $0.05 \leq y \leq 0.9$ and $-3.0x+1.8 \leq y \leq -3.0x+5.7$).

Non patent literature 1 reports the characteristic evaluation in the case where $Li_6PS_5Cl_{1-x}Br_x$ ($0 \leq x \leq 1$) is produced by dissolving $Li_6PS_5Br$ to $Li_6PS_5Cl$ through synthesis by a mechanochemical process and a heat treatment.

Non patent literature 2 produces a solid solution of $Li_6PS_5Cl_{1-x}Br_x$ ($0 \leq x \leq 1$) containing two kinds of halogens through a mechanochemical process and a subsequent heat treatment, and reports the relationship between the composition and the ion conductivity thereof.

CITATION LIST

Patent Literatures

Patent literature 1: JP 2001-250580 A
Patent literature 2: JP 2011-96630 A

Patent literature 3: JP 2010-540396 T
Patent literature 4: JP 2013-137889 A
Patent literature 5: WO 2015/012042
Patent literature 6: WO 2016/104702

Non Patent Literatures

Non patent literature 1: Yosuke UKAWA, et al., "Preparation procedure of argyrodite-type $Li_6PS_5X$ (X=Cl, Br, I) solid electrolytes and their ionic conductivity", Symposium on Basic Science of Ceramics, January 2015 (1G18), the Ceramic Society of Japan Non patent literature 2: Yosuke UKAWA, et al., "Characterization of argyrodite-type $Li_6PS_5Cl_{1-x}Br_x$ solid electrolytes", the Electrochemical Society of Japan, March 2015 (2H08)

SUMMARY OF INVENTION

Further decrease of the resistance of the all solid battery is being demanded. For further decreasing the resistance of the all solid battery, a solid electrolyte having a high ion conductivity has been developed. However, it is difficult to decrease the resistance of the all solid battery only from that standpoint, and therefore an approach from another standpoint is necessarily studied.

As a result of the studies by the present inventors, it has been found that with a solid electrolyte material that has a high crystallinity but has a low elastic modulus, the voids among the active material particles can be avoided through collapse of the solid electrolyte material by applying a pressing pressure thereto in the production of an electrode, the contact points and the contact area to the active material particles can be increased, and thereby the battery resistance can be decreased.

A sulfide compound having a cubic argyrodite type crystal structure generally has characteristics including high crystallinity and excellent ion conductivity, but has high hardness, and thus has a problem of difficulty in collapse with the pressing pressure in the production of an electrode.

Under the circumstances, the present invention relates to a sulfide compound having a cubic argyrodite type crystal structure, and is to propose a novel sulfide compound that has a low elastic modulus while retaining the high ion conductivity.

The present invention proposes a sulfide compound for a solid electrolyte of a lithium secondary battery that includes a crystal phase of a cubic argyrodite type crystal structure, and is represented by the compositional formula: $Li_{7-x}PS_{6-x}Cl_yBr_z$, wherein x in the compositional formula satisfies x=y+z and 1.0<x≤1.8, and a ratio (z/y) of the molar ratio of Br to the molar ratio of Cl is from 0.1 to 10.0.

The sulfide compound proposed in the present invention has a crystal phase of a cubic argyrodite type crystal structure, and in the sulfide compound represented by the compositional formula: $Li_{7-x}PS_{6-x}Cl_yBr_z$, the total molar ratio of Cl and Br is made larger than 1.0, and the ratio of the molar ratio of Br to the molar ratio of Cl is regulated to the particular range, whereby the elastic modulus can be decreased while retaining the high ion conductivity, resulting in decrease of the battery resistance. For example, in the production of an electrode by using the sulfide compound proposed in the present invention as the solid electrolyte, the solid electrolyte is collapsed to avoid the voids among the active material particles by applying a pressing pressure thereto, the contact points and the contact area to the active material particles can be increased, and thereby the battery resistance can be decreased. Accordingly, the sulfide compound proposed in the present invention can be used particularly favorably as a solid electrolyte of a lithium secondary battery.

DESCRIPTION OF THE INVENTION

Figure 1:
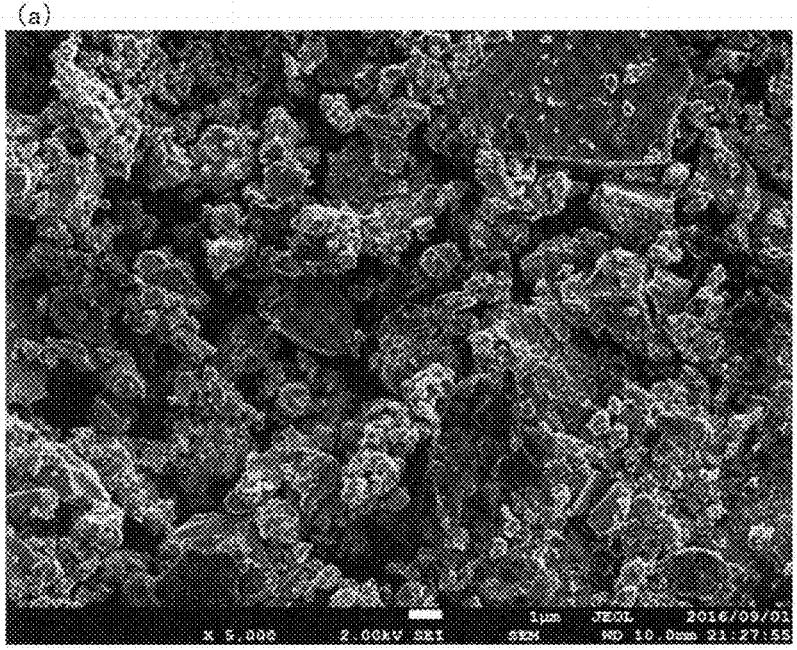
FIG. 1(a) is a micrograph of a scanning electron microscope (SEM) (magnification: 5,000) obtained through observation of the sulfide compound obtained in Example 4 (sample) with an SEM.
FIG. 1(b) is a micrograph of an SEM (magnification: 5,000) obtained through observation of the cross section of the sulfide compound obtained in Example 4 (sample) having been pelletized under a pressure of 200 MPa with an SEM.
Figure 1:
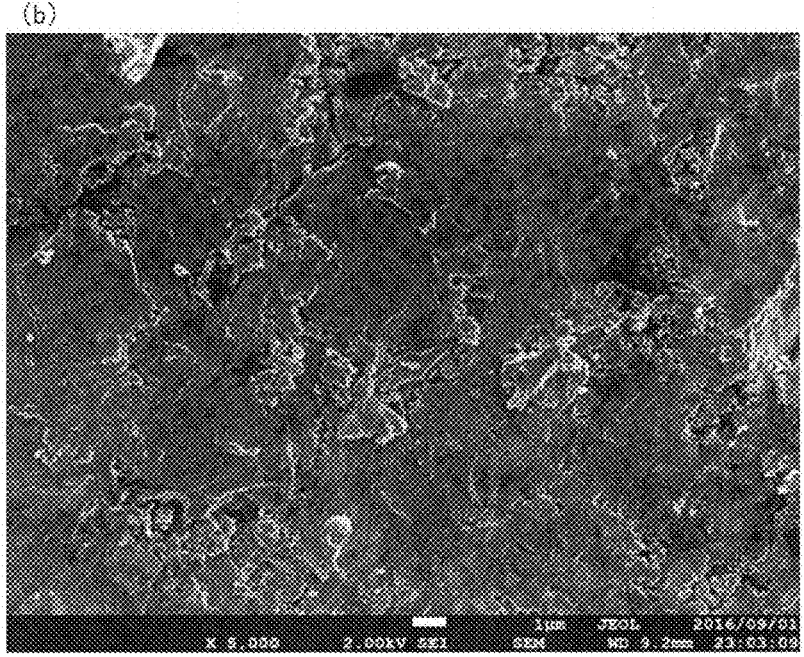

Embodiments of the present invention will be described in detail below. However, the scope of the present invention is not limited to the embodiments described below.

<Present Solid Electrolyte>

The sulfide solid electrolyte according to one example of the present embodiment (which may be referred to as a "present solid electrolyte") is a solid electrolyte for a lithium secondary battery containing a sulfide compound (which may be referred to as a "present sulfide compound") that has a crystal phase of a cubic argyrodite type crystal structure and is represented by the compositional formula (1): $Li_{7-x}PS_{6-x}Cl_yBr_z$ (x=y+z).

<Present Sulfide Compound>

The present sulfide compound is a compound that has a crystal phase of a cubic argyrodite type crystal structure and is represented by the compositional formula (1): $Li_{7-x}PS_{6-x}Cl_yBr_z$.

The presence of the crystal phase of a cubic argyrodite type crystal structure can be confirmed, for example, by the analysis by the X-ray diffractometry (XRD, Cu radiation source) as described below.

In the compositional formula (1), the total molar ratio x of Cl and Br (=y+z) preferably satisfies 1.0<x≤1.8.

The total molar ratio x of Cl and Br (=y+z) that is more than 1.0 and 1.8 or less is preferred since the ion conductivity can be further increased. In particular, in the case where x is 1.8 or less, the formation of a heterogeneous phase can be controlled, and the decreasing of ion conductivity can be suppressed.

From this standpoint, x in the compositional formula (1) is preferably more than 1.0 and 1.8 or less, and among others, it is more preferably 1.1 or more or 1.7 or less, even more preferably 1.2 or more or 1.6 or less.

In the compositional formula (1), the ratio (z/y) of the molar ratio of Br to the molar ratio of Cl is preferably from 0.1 to 10.

The ratio (z/y) of the molar ratio of Br to the molar ratio of Cl that is 0.1 or more is preferred since the solid electrolyte has a low elastic modulus, and on the other hand, the ratio (z/y) of the molar ratio of Br to the molar ratio of Cl that is 10 or less is preferred since a high ion conductivity is obtained.

From this standpoint, the ratio (z/y) of the molar ratio of Br to the molar ratio of Cl is preferably from 0.1 to 10, and among others, it is more preferably 0.2 or more or 5 or less, and even more preferably 0.3 or more or 3 or less.

In the compositional formula (1), y representing the molar ratio of Cl preferably satisfies $0.3 \leq y \leq 1.5$.

The molar ratio y of Cl that is 0.3 or more is preferred since the ion conductivity can be further enhanced as compared to less than 0.3, and on the other hand, y of 1.5 or less is preferred since the low elastic modulus can be retained.

From this standpoint, y in the compositional formula (1) is preferably from 0.3 to 1.5, and among others, it is more preferably 0.4 or more or 1.2 or less, even more preferably 0.6 or more or 1.0 or less.

In the compositional formula (1), z representing the molar ratio of Br preferably satisfies $0.3 \leq y \leq 1.5$.

The molar ratio z of Br that is 0.3 or more is preferred since the elastic modulus can be further decreased, and on the other hand, z of 1.5 or less is preferred since the ion conductivity can be retained.

A Br compound has a lower melting point than a Cl compound, and therefore the addition of a Br compound may enhance the reactivity, facilitating the synthesis of the sulfide compound.

From this standpoint, z in the compositional formula (1) is preferably from 0.3 to 1.5, and among others, it is more preferably 0.4 or more or 1.2 or less, even more preferably 0.6 or more or 1.0 or less.

It suffices that the present solid electrolyte contains the present sulfide compound, and therefore the present solid electrolyte may contain additional materials and components.

Accordingly, the present solid electrolyte may be formed of either: a single phase constituted by a crystal phase of a cubic argyrodite type crystal structure; a mixed phase containing a crystal phase of a cubic argyrodite type crystal structure and a crystal phase represented by LiCl; a mixed phase containing a crystal phase of a cubic argyrodite type crystal structure and a crystal phase represented by LiBr; and a mixed phase containing a crystal phase of a cubic argyrodite type crystal structure, a crystal phase represented by LiCl, and a crystal phase represented by LiBr.

The mixed phase containing a crystal phase of a cubic argyrodite type crystal structure and a crystal phase represented by LiCl and/or LiBr may encompass not only a mixed phase of a crystal phase of a cubic argyrodite type crystal structure and a crystal phase represented by LiCl and/or LiBr, but also cases containing a crystal phase other than these phases.

Examples of the additional materials include the other solid electrolyte materials, $Li_2S$, $Li_3PS_4$, and $Li_4P_2S_6$, but are not limited thereto.

The present solid electrolyte is preferably formed of the present sulfide compound as a major material, and the present solid electrolyte is preferably occupied by the present sulfide compound in a proportion of 50% by mass or more, particularly 80% by mass or more, and further particularly 90% by mass or more (including 100% by mass), and is particularly preferably constituted only by the present sulfide compound.

The present solid electrolyte may contain, in addition to the aforementioned materials, unavoidable impurities to a degree that does not adversely affect the effects of the present invention, for example, approximately less than 5% by mass, and particularly approximately less than 3% by mass.

(Particle Diameter)

The present solid electrolyte is preferably particles in the form of powder, and for the particle diameter thereof, the average particle diameter (D50), i.e., the average particle diameter (D50) obtained by the laser diffractive scattering particle size distribution measurement method, of the present solid electrolyte is preferably from 0.1 μm to 10 μm.

D50 that is 0.1 μm or more is preferred since the increase of resistance due to the increase of the surface of the solid electrolyte particles and the difficulty in mixing with the active material can be avoided. D50 that is 10 μm or less is preferred since the present solid electrolyte can readily intervene into gaps among the active material, so as to increase the contact points and the contact area.

From this standpoint, the average particle diameter (D50) of the present solid electrolyte is preferably from 0.1 μm to 10 μm, and among others, it is more preferably 0.3 μm or more or 7 μm or less, even more preferably 0.5 μm or more or 5 μm or less.

The average particle diameter (D50) of the present solid electrolyte is preferably from 1 to 100% of the average particle diameter (D50) of the positive electrode active material or the average particle diameter (D50) of the negative electrode active material.

The average particle diameter (D50) of the present solid electrolyte that is 1% or more of the average particle diameter (D50) of the positive electrode active material or the average particle diameter (D50) of the negative electrode active material is preferred since the present solid electrolyte can tightly fill the voids among the active material. On the other hand, 100% or less is preferred from the standpoint of the increase of the energy density of the battery since the proportion of the active material in the electrode is increased.

From this standpoint, the average particle diameter (D50) of the present solid electrolyte is preferably from 1 to 100% of the average particle diameter (D50) of the positive electrode active material or the average particle diameter (D50) of the negative electrode active material, and among others, it is more preferably 3% or more or 50% or less, even more preferably 5% or more or 30% or less.

(Elastic Modulus)

The Young's modulus of the present solid electrolyte is preferably from 1 GPa to 30 GPa.

The Young's modulus of the present solid electrolyte that is 1 GPa or more is preferred since the present solid electrolyte is hardly aggregated and can be readily produced. On the other hand, the Young's modulus of the present solid electrolyte that is 30 GPa or less is preferred since the present solid electrolyte may be collapsed at the interface to the active material and thereby the contact area can be increased.

From this standpoint, the Young's modulus of the present solid electrolyte is preferably from 1 GPa to 30 GPa, and among others, it is more preferably 5 GPa or more or 28 GPa or less, even more preferably 10 GPa or more or 25 GPa or less.

For controlling the Young's modulus of the present solid electrolyte to the aforementioned range, the present solid electrolyte is preferably subjected to a heat treatment at from 450 to 600° C. (material temperature), and particularly from 450 to 500° C. while flowing hydrogen sulfide ($H_2S$) gas.

(Ion Conductivity)

It has been known that a sulfide solid electrolyte is inherently excellent in ion conductivity, and can form a favorable contact state to an active material at ordinary temperature to decrease the interface resistance, as compared to an oxide. In particular, the present solid electrolyte can achieve the decrease of the elastic modulus while retaining the ion conductivity.

(Production Method)

One example of the production method of the present sulfide compound or the present solid electrolyte will be described. However, the production method described herein is only one example, and the production method is not limited thereto.

The present sulfide compound or the present solid electrolyte may be obtained, for example, in such a manner that lithium sulfide ($Li_2S$) powder, diphosphorus pentasulfide ($P_2S_5$) powder, lithium chloride (LiCl) powder, and lithium bromide (LiBr) powder are mixed and calcined.

As the mixing method of the raw materials, the raw materials are preferably pulverized and mixed, for example, with a ball mill, a bead mill, a homogenizer, or the like.

In the pulverization and mixing at this time, considerably strong mechanical pulverization and mixing with the mechanical alloying method or the like may cause the decrease in crystallinity or the amorphization of the raw material powder or the homogenization of the raw material mixed powder whereby the bond between cation and sulfur is broken to cause sulfur deficiency in calcining and exhibition of electron conductivity. Accordingly, pulverization and mixing are preferably performed to such an extent that the crystallinity of the raw material powder can be retained.

After mixing as shown above, present sulfide compound or the present solid electrolyte may be obtained in such a manner that the resulting powder is dried as necessary, then calcined in an inert atmosphere or under a stream of hydrogen sulfide gas ($H_2S$), cracked and pulverized as necessary, and then classified.

The present sulfide compound undergoes crystallization at approximately 200° C., and therefore can be synthesized by calcining at a relatively low temperature. Accordingly, the present sulfide compound, which is a sulfide having the target chemical composition and substantially no sulfur deficiency, can be produced by calcining at 350° C. or more in an inert atmosphere or under a stream of hydrogen sulfide gas ($H_2S$).

In particular, in the case where hydrogen sulfide gas is used in calcining, the sulfur partial pressure in the vicinity of the calcined sample can be increased with sulfur gas formed through decomposition of hydrogen sulfide in calcining, and thus sulfur deficiency hardly occurs at a high calcining temperature, thereby decreasing the electron conductivity. Accordingly, in the case where the calcining is performed in an atmosphere containing hydrogen sulfide gas, the calcining temperature is preferably from 350 to 650° C., and among others, it is more preferably 450° C. or more or 600° C. or less, even more preferably 500° C. or less.

In the case where the calcining is performed in an inert atmosphere, on the other hand, the sulfur partial pressure in the vicinity of the calcined sample cannot be increased in calcining, which is different from the case with hydrogen sulfide gas, and therefore sulfur deficiency tends to occur at a high calcining temperature, resulting in increase of the electron conductivity. Accordingly, in the case where the calcining is performed in an inert atmosphere, the calcining temperature is preferably from 350 to 500° C., and among others, it is more preferably 350° C. or more or 450° C. or less, even more preferably 400° C. or more or 450° C. or less.

For reacting the raw material powder completely to avoid the unreacted phase remaining, the calcining is generally preferably performed at 450° C. or more under a stream of hydrogen sulfide gas, but the raw material powder having a small particle diameter and thus having high reactivity may be calcined in an inert atmosphere since the reaction thereof can be accelerated at a low temperature.

The aforementioned raw materials are considerably unstable in the air and may undergo decomposition through reaction with water to generate hydrogen sulfide gas, or oxidation, and therefore the raw materials are preferably placed in the furnace in a glove box substituted by an inert gas atmosphere or the like, and then calcined.

According to the production in this manner, occurrence of sulfur deficiency can be suppressed, and the electron conductivity can be decreased. Accordingly, the all solid lithium secondary battery that is produced by using the present sulfide compound as the solid electrolyte can have favorable battery characteristics including the charge and discharge efficiency and the cycle characteristics.

In the production method of the present sulfide compound or the present solid electrolyte, for controlling the Young's modulus of the present sulfide compound or the present solid electrolyte to 30 GPa or less, it is preferred that a compound containing lithium (Li), a compound containing phosphorus (P), a compound containing sulfur (S), a chlorine-containing compound, and a bromine-containing compound are mixed, dried as necessary, then calcined under a stream of hydrogen sulfide gas ($H_2S$) at from 450 to 600° C. (material temperature), and particularly from 450 to 500° C. (material temperature), cracked and pulverized as necessary, and then classified.

Examples of the compound containing lithium (Li) include a lithium compound, such as lithium sulfide ($Li_2S$), lithium oxide ($Li_2O$), and lithium carbonate ($Li_2CO_3$), and metallic lithium as an elemental substance.

Examples of the compound containing phosphorus (P) include a phosphorus sulfide, such as diphosphorus trisulfide ($P_2S_3$), and diphosphorus pentasulfide ($P_2S_5$), a phosphorus compound, such as sodium phosphate ($Na_3PO_4$), and phosphorus as an elemental substance.

Examples of the compound containing sulfur (S) include lithium sulfide and phosphorus sulfide described above.

Examples of the chlorine-containing compound include LiCl, $PCl_3$, $PC_{15}$, $POCl_3$, $P_2Cl_4$, $SCl_2$, $S_2Cl_2$, NaCl, and $BCl_3$.

Examples of the bromine-containing compound include LiBr, $PBr_3$, $POBr_3$, $S_2Br_2$, NaBr, and $BBr_3$.

Among these, a combination of lithium sulfide, phosphorus sulfide, lithium chloride, and lithium bromide is preferred.

In the production method, preferred examples of the mixing method of the raw materials include pulverization and mixing with a ball mill, a bead mill, or a homogenizer, but not a mixing method imparting a strong mechanical stress, such as a planetary ball mill.

The aforementioned raw materials are unstable in the air and may undergo decomposition through reaction with water, generation of hydrogen sulfide gas, or oxidation, and therefore the raw materials are preferably placed in the furnace in a glove box substituted by an inert gas atmosphere or the like, and then calcined.

<Applications of Present Solid Electrolyte>

The present solid electrolyte can be used as a solid electrolyte layer of an all solid lithium secondary battery, a solid electrolyte to be mixed with a positive electrode or negative electrode mixture, and the like.

For example, an all solid lithium secondary battery can be constituted by forming a positive electrode, a negative electrode, and a layer containing the solid electrolyte between the positive electrode and the negative electrode.

At this time, the present solid electrolyte is excellent in water resistance and oxidation resistance and undergoes less characteristic deterioration even handling in dry air, and thus the assembling work of the all solid lithium secondary battery can be performed, for example, in a dry room.

The layer containing the solid electrolyte herein can be produced by methods, for example, a method of dropping a slurry containing the solid electrolyte, a binder, and a solvent on a substrate and cutting with a doctor blade or the like by rubbing, a method of bringing the slurry in contact with the substrate and cutting with an air knife, a method of forming a coated film by a screen printing method or the like, and then the solvent is removed through heating and drying. In alternative, the layer can also be produced in such a manner that powder of the solid electrolyte is formed into a green compact by pressing or the like, and then appropriately process the green compact.

The positive electrode material used may be a positive electrode material that has been used as a positive electrode active material of a lithium secondary battery. Examples of the positive electrode active material may include a spinel type lithium transition metal oxide, a lithium transition metal oxide having a layer structure, an olivine, or a mixture of two or more kinds thereof.

The negative electrode material used may be a negative electrode material that has been used as a negative electrode active material of a lithium secondary battery.

For example, since the present solid electrolyte is electrochemically stable, a carbonaceous material, such as artificial graphite, natural graphite, and non-graphitizable carbon (hard carbon), which performs charge and discharge at a baser potential (approximately 0.1 V vs. $Li^+/Li$) comparable to metallic lithium, can be used as the negative electrode active material of the lithium secondary battery. Accordingly, the energy density of the all solid lithium secondary battery can be largely enhanced by using the carbonaceous material as the negative electrode active material along with the present solid electrolyte as the electrolyte of the lithium secondary battery. Consequently, a lithium secondary battery having the present solid electrolyte, and a negative electrode active material containing carbon, such as artificial graphite, natural graphite, and non-graphitizable carbon (hard carbon), can be constituted.

Furthermore, a silicon active material, which is expected as a high capacity negative electrode material, can be used as the negative electrode active material of the lithium secondary battery.

In an all solid battery, a silicon active material undergoes large expansion and contraction in repeated charge and discharge, and therefore is considered to be significantly difficult to retain the contact to the solid electrolyte.

The present solid electrolyte used as the electrolyte of the all solid lithium ion battery can be deformed following the expansion and contraction of the silicon active material since the present solid electrolyte has such characteristics as a low Young's modulus, i.e., a low elastic modulus, whereby an effect of enhancing the cycle characteristics can be expected. Consequently, a lithium secondary battery having the present solid electrolyte and a silicon negative electrode active material can be constituted.

<Production Method of Electrode for Lithium Secondary Battery Using Present Solid Electrolyte>

The negative electrode can be produced, for example, in such a manner that the present solid electrolyte, the negative electrode active material, and as necessary additional materials, such as a conductive auxiliary agent and a binder, are mixed and molded into a prescribed shape, such as a plate shape, by compression press.

The positive electrode can be produced, for example, in such a manner that the present solid electrolyte, the positive electrode active material, and as necessary additional materials, such as a conductive auxiliary agent and a binder, are mixed and molded into a prescribed shape, such as a plate shape, by compression press.

<Explanation of Terms>

In the present invention, the "solid electrolyte" means an entire substance retaining a solid state, in which an ion, such as Lit, can migrate.

In the present invention, the "lithium secondary battery" is a term that widely encompasses secondary batteries that perform charge and discharge through migration of lithium ion between a positive electrode and a negative electrode.

In the present invention, the expression "from X to Y" (wherein X and Y each show an arbitrary numeral) encompasses the meaning of "X or more and Y or less", and also encompasses the meaning of "preferably greater than X" or "preferably less than Y" unless otherwise indicated.

The expression "X or more" (wherein X shows an arbitrary numeral) or "Y or less" (wherein Y shows an arbitrary numeral) encompasses the meaning of "preferably greater than X" or "preferably less than Y".

EXAMPLE

The present invention will be described with reference to examples below. However, the present invention is not construed as being limited thereto.

Examples 1 to 5 and Comparative Examples 1 to 3

Lithium sulfide ($Li_2S$) powder, diphosphorus pentasulfide ($P_2S_5$) powder, lithium chloride (LiCl) powder, and lithium bromide (LiBr) powder each were weighted to make a total amount of 75 g with the raw material composition (% by mol) shown in Table 1, and pulverized and mixed with a ball mill for 6 hours to prepare mixed powder. The mixed powder was filled into a carbon vessel, which was heated at a temperature raise rate of 200° C./h and calcined at 500° C. for 4 hours, under a stream of hydrogen sulfide gas ($H_2S$, purity: 100%) at 1.0 L/min in a tubular electric furnace. Thereafter, the sample was cracked with a mortar and granulated with a sieve having an aperture of 53 μm to provide a sample (i.e., a sulfide compound as a solid electrolyte) in the form of powder.

At this time, the weighing, mixing, placing in the electric furnace, taking out from the electric furnace, cracking, and granulating operations were all performed in a glove box having been substituted by sufficiently dried Ar gas (dew point: −60° C. or less).

Example 6

A sample (i.e., a sulfide compound) in the form of powder was obtained in the same manner as above except that the stream gas was changed to argon, and the calcining temperature was changed to 450° C. The raw material composition is shown in Table 1.

<Measurement of Composition>

The samples (i.e., the sulfide compounds) obtained in Examples and Comparative Examples each were measured for the composition by the ICP emission spectrometry. The values of x, y, z, and (z/y) in the compositional formula: $Li_{7-x}PS_{6-x}Cl_yBr_z$ are shown in Table 1.

<X-Ray Diffraction>

The samples (i.e., the solid electrolyte) in the form of powder obtained in Examples and Comparative Examples each were analyzed by the X-ray diffractometry (XRD, Cu radiation source) to identify the formed phases.

The samples obtained in Examples 1 to 5 each were confirmed to have a single phase constituted by a crystal phase of a cubic argyrodite type crystal structure and to have high crystallinity.

<Measurement of Average Particle Diameter>

The samples (i.e., the solid electrolyte) in the form of powder obtained in Examples and Comparative Examples each were measured for the particle size distribution in such a manner that the sample (powder) was placed in a non-aqueous solvent and irradiated with ultrasonic wave of 40 W for 360 seconds with an automatic sample feeder for a laser diffraction particle size analyzer ("Microtorac SDC", produced by Nikkiso Co., Ltd.) at a flow rate of 40%, and then measured for the particle size distribution with a laser diffraction particle size analyzer "MT3000II", produced by Nikkiso Co., Ltd., and the average particle diameter (D50) was measured from the resulting volume based particle size distribution chart.

Meanwhile, at the time of measurement, the non-aqueous solvent was filtered through a filter having a pore size of 60 μm, and the average value obtained by making two measurements under the conditions of a solvent refractive index of 1.50, penetration for the particle penetrability conditions, a particle refractive index of 1.59, a non-spherical shape, a measurement range of 0.133 to 704.0 μm, and a measurement time of 30 seconds, was defined as D50.

<Observation of SEM Micrograph>

The sulfide compounds (sample) obtained in Examples and Comparative Examples each were pelletized by applying a pressure of 200 MPa assuming the press compression in forming an electrode, and the cross section thereof was observed with a scanning electron microscope (SEM). Based on the resulting SEM micrograph (magnification: 5,000), the ratings "○: good" and "x: poor" were judged by the following standard. The sample not evaluated was shown with "-".

○(good): Collapsed state of the sulfide compound was observed.

x(poor): Collapsed state of the sulfide compound was not observed.

<Measurement of Young's Modulus>

The samples (i.e., the sulfide compounds) in the form of powder obtained in Examples and Comparative Examples each were measured for the force curve with an atomic force microscope (AFM) ("Dimension Icon, produced by Bruker Corporation), and the elastic modulus (Young's modulus) was obtained from the resulting force curve.

In a glove box with an Ar atmosphere, the sample was scattered on and fixed to a silicon wafer having an epoxy resin thinly coated thereon, so as to prepare a measurement sample.

As for the measurement condition, the force curve was measured in the Ramp mode (force curve measurement mode) for 10 particles per one sample.

The measurement parameters were adjusted to calculate the prescribed value with the known standard sample (glass, elastic modulus: 72 GPa), and then the sample was measured.

The measurement environment was an Ar atmosphere (oxygen concentration: <0.1 ppm, water concentration: <0.1 ppm), 25° C., and a diamond probe (DNISP-HS), produced by Bruker Corporation as the measurement probe.

With the resulting force curve, the damping Young's modulus was obtained by force curve fit with DMT model, and the Young's modulus of the sample was obtained with a Poisson ratio of 0.3 derived from the relational expression of the damping Young's modulus and the Young's modulus of the sample.

$$F-Fadh=4/3E^*\sqrt{R(d-d_0)^3}$$  Expression 1

In the expression 1, F represents the force applied with the cantilever; Fadh represents the absorption force; $E^*$ represents the damping Young's modulus; R represents the curvature radius of the cantilever; and d-do represents the distance between the cantilever and the sample.

$$E^* = \frac{E_s}{1-v_s^2}$$  Expression 2

In the expression 2, $E^*$ represents the damping Young's modulus; $E_s$ represents the Young's modulus of the sample; and $V_s$ represents the Poisson ratio of the sample.

By the use of the measurement of the Young's modulus by a compression test represented by indentation, it is difficult to distinguish between the cohesive force of the secondary particles formed through aggregation of the primary particles and the elastic modulus inherent to the primary particles, with the deformability of the secondary particles becoming predominant, and therefore it is difficult to measure the actual elastic modulus of the particles.

On the other hand, the measurement of the Young's modulus by the aforementioned method employed in the examples of the present invention calculates the value on the surface of the particles, and therefore the elastic modulus inherent to the particles can be measured.

<Measurement of Ion Conductivity>

The samples (i.e., the sulfide compounds) obtained in Examples and Comparative Examples each were subjected to uniaxial press molding at a pressure of 200 MPa and further subjected to cold isotropic press (CIP) at a pressure of 200 MPa, so as to prepare a pellet having a diameter of 10 mm and a thickness of from 2 to 5 mm, in a glove box having been substituted by sufficiently dried Ar gas (dew point: −60° C. or less), and a carbon paste as electrodes was coated on the upper and lower surface of the pellet and subjected to a heat treatment at 180° C. for 30 minutes, so as to produce a sample for measuring the ion conductivity. The ion conductivity was measured by the alternating current impedance method at room temperature (25° C.).

<Production and Use Method of Lithium Secondary Battery using Present Solid Electrolyte Compound>

(Materials)

$LiNi_{0.5}Co_{0.2}Mn_{0.3}O_2$ (NCM) powder (D50: 6.7 μm), which was a ternary layered compound, was used as the positive electrode active material, graphite (Gr) powder (D50: 20 μm) was used as the negative electrode active material, and the samples (i.e., the sulfide compounds) obtained in Examples and Comparative Examples were used as the solid electrolyte powder.

The positive electrode mixture powder was prepared by mixing the positive electrode active material powder, the solid electrolyte powder, and the conductive auxiliary agent (acetylene black) at a weight ratio of 60/37/3 with a mortar, and subjected to uniaxial press molding at 20 MPa to provide a positive electrode mixture pellet.

The negative electrode mixture powder was prepared by mixing the graphite powder and the solid electrolyte powder at a weight ratio of 64/36 with a mortar.

The lower opening of a polypropylene cylinder having openings on the upper and lower end thereof (opening diameter: 10.5 mm, height: 18 mm) was closed with a positive electrode (formed of stainless steel (SUS)), and the positive electrode mixture pellet was placed on the positive electrode. The powder solid electrolyte was placed thereon, and subjected to uniaxial pressing at 180 MPa to form the positive electrode mixture and the solid electrolyte layer. The negative electrode mixture powder was placed thereon, and after closing with a negative electrode (formed of stainless steel (SUS)), was subjected to uniaxial pressing at 550 MPa, so as to produce a dies battery having a three-layer structure including the positive electrode mixture having a thickness of approximately 100 μm, the solid electrolyte layer having a thickness of approximately 300 μm, and the negative electrode mixture having a thickness of approximately 20 μm.

(Evaluation of Battery)

The dies battery thus produced above was subjected to the measurement of the electric resistance and the charge and discharge test.

The battery was placed in an environmental tester configured to have an environmental temperature of 25° for charge and discharge of the battery, prepared for charge and discharge, and allowed to stand to conform the battery temperature to the environmental temperature.

The alternating current resistance at 1 kHz was measured before charging, and the resulting value was designated as the alternating current resistance before charging.

The battery was subjected to charge and discharge at 1 mA as 1 C. The battery was then subjected to constant current and constant potential charge at 0.1 C to 4.5 V, and the initial charge capacity was obtained. The alternating current resistance at 1 kHz was measured as similar to before charging, and the resulting value was designated as the alternating current resistance before discharging.

The battery was then subjected to constant current discharge at 0.1 C to 2.5 V, and the initial discharge capacity was obtained. The initial charge and discharge efficiency was obtained from the discharge capacity with respect to the charge capacity.

The battery was then subjected to constant current and constant potential charge at 0.2 C to 4.5 V and then constant current discharge at 5 C to 2.5 V, and the discharge capacity at 5 C was obtained. The ratio of the discharge capacity at 5 C with respect to the discharge capacity at 0.1 C as 100% was calculated and designated as the rate characteristics (i.e., the 5 C capacity retention rate (%)).

TABLE 1

| | y (Cl) | z (Br) | z/y | x (=y + z) | Ion conductivity ($\times 10^{-3}$ S/cm) | Average particle diameter (D50) (μm) | Young's modulus (GPa) | Alternating current resistance before charging (Ω) |
|---|---|---|---|---|---|---|---|---|
| Example 1 | 0.4 | 1.2 | 3.0 | 1.6 | 3.4 | 3.3 | 19 | 57 |
| Example 2 | 1.2 | 0.4 | 0.3 | 1.6 | 5.0 | 2.6 | 22 | 53 |
| Example 3 | 0.6 | 0.6 | 1.0 | 1.2 | 2.7 | 3.8 | 21 | 54 |
| Example 4 | 0.8 | 0.8 | 1.0 | 1.6 | 4.2 | 2.9 | 18 | 57 |
| Example 5 | 0.8 | 0.8 | 1.0 | 1.6 | 5.5 | 0.76 | 19 | 58 |
| Comparative Example 1 | 1.2 | 0 | 0 | 1.2 | 2.9 | 2.4 | 42 | 136 |
| Comparative Example 2 | 0 | 1.6 | — | 1.6 | 0.35 | 3.4 | 22 | 51 |
| Comparative Example 3 | 0.5 | 0.5 | 1.0 | 1.0 | 1.6 | 3.6 | 24 | 54 |
| Example 6 | 0.8 | 0.8 | 1.0 | 1.6 | 2.4 | 3.9 | 32 | 54 |

| | Alternating current resistance before discharging (Ω) | Initial charge capacity (mAh/g) | Initial discharge capacity (mAh/g) | Initial charge and discharge efficiency (%) | Rate characteristics 5 C capacity retention rate (%) | SEM micrograph judgment |
|---|---|---|---|---|---|---|
| Example 1 | 52 | 248.8 | 184 | 74.0 | 33.6 | ○ (good) |
| Example 2 | 54 | 236.5 | 176.8 | 74.8 | 31.7 | ○ (good) |
| Example 3 | 46 | 239.9 | 178.2 | 74.3 | 27.7 | — |
| Example 4 | 45 | 232.6 | 173.9 | 74.8 | 35.4 | ○ (good) |
| Example 5 | 48 | 239 | 186.6 | 78.1 | 52.9 | — |
| Comparative Example 1 | 139 | 231.8 | 173.9 | 75.0 | 28.3 | x (poor) |
| Comparative Example 2 | 46 | 243.6 | 178.9 | 73.4 | 19.1 | — |
| Comparative Example 3 | 57 | 237.7 | 177.1 | 74.5 | 19.6 | — |
| Example 6 | 55 | 240.3 | 181.3 | 75.5 | 20.3 | x (poor) |

It is found from the results shown in Table 1 and the test results having been obtained that in the case where only Cl is contained as halogen, the ion conductivity can be retained, but the electric resistance tends to increase due to the high elastic modulus and the high hardness. It is also found that in the case where only Br is contained as halogen, the electric resistance is decreased due to the low elastic modulus and the low hardness, but the ion conductivity tends to decrease resulting in lower the rate characteristics. At this time, an ion conductivity of $2.0 \times 10^{-3}$ S/cm or more, an alternating current resistance before charging of 100Ω or less, and rate characteristics (5 C capacity retention rate) of 20% or more are practically preferred, and these values can be used as the judgement standard.

It is confirmed from the comparison between Example 3 and Comparative Example 1 that as compared to Comparative Example 1, Example 3 had a low battery resistance, i.e., was excellent, irrespective of the low ion conductivity thereof.

It can be understood therefore that by containing Br in the prescribed ratio with respect to Cl as halogen, a solid electrolyte capable of exhibiting a more excellent battery capability for the battery resistance while retaining the practically high ion conductivity can be provided.

Figure 2:
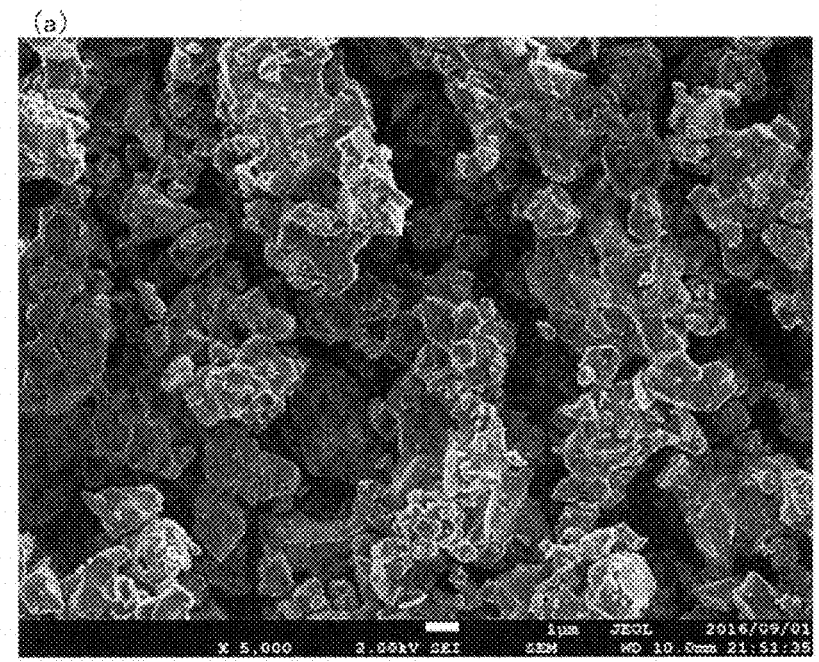
FIG. 2(a) is a micrograph of a scanning electron microscope (SEM) (magnification: 5,000) obtained through observation of the sulfide compound obtained in Comparative Example 1 (sample) with an SEM.
FIG. 2(b) is a micrograph of an SEM (magnification: 5,000) obtained through observation of the cross section of the sulfide compound obtained in Comparative Example 1 (sample) having been pelletized under a pressure of 200 MPa with an SEM.
Figure 2:
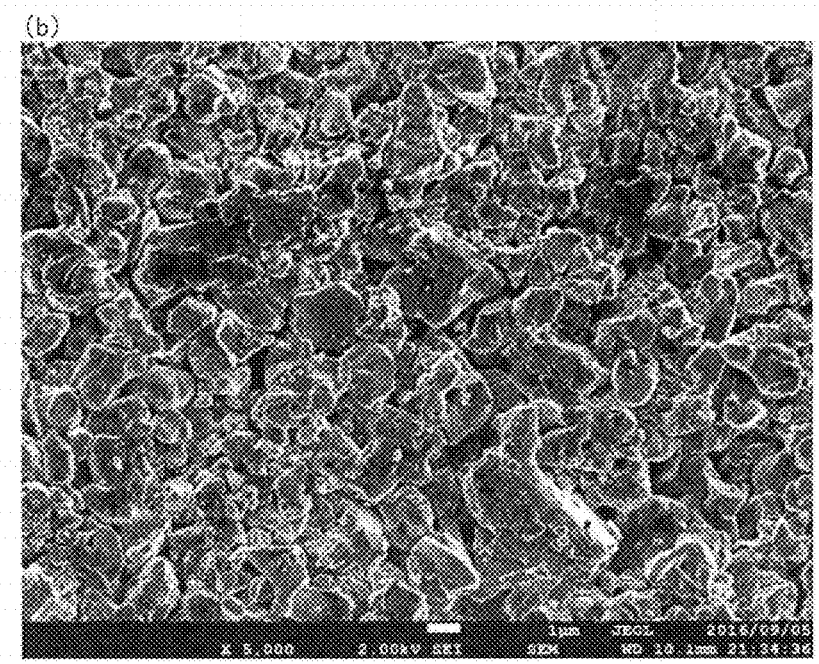

As a result of the observation of the cross sections of the pellets of the solid electrolytes of the examples with a scanning electron microscope (SEM), the collapsed state of the solid electrolyte could be observed as shown in FIG. 1 (Example 4) in the case where the Young's modulus of the sulfide compound used as the solid electrolyte became 23 GPa or less. In the case where the Young's modulus of the sulfide compound exceeded 30 GPa, on the other hand, the collapsed state of the solid electrolyte was not observed as shown in FIG. 2 (Comparative Example 1).

It is found from the results shown in Table 1 and the test results having been obtained that as for the sulfide compound represented by the compositional formula: $Li_{7-x}PS_{6-x}Cl_yBr_z$ the elastic modulus can be decreased, and the battery resistance can be decreased, by making the total molar ratio of Cl and Br larger than 1.0, and making the ratio of the molar ratio of Br with respect to the molar ratio of Cl within the prescribed range.

It is also found that for further increasing the rate characteristics in the case where both Cl and Br are contained as halogen, the elastic modulus, i.e., the Young's modulus, is preferably further decreased by calcining at from 450 to 600° C. (material temperature) under a stream of hydrogen sulfide ($H_2S$) gas in the production method thereof.

The invention claimed is:

1. A sulfide compound for a solid electrolyte of a lithium secondary battery, comprising a crystal phase of a cubic argyrodite type crystal structure, and being represented by the compositional formula: $Li_{7-x}PS_{6-x}Cl_yBr_z$, wherein x in the compositional formula satisfies x=y+z and 1.0<x≤1.8, and a ratio (z/y) of the molar ratio of Br to the molar ratio of Cl is from 0.1 to 10.0, and wherein a Young's modulus of the sulfide compound is 1 GPa to 32 GPa.

2. The sulfide compound according to claim 1, wherein in the compositional formula, y satisfies 0.3≤y≤1.5, and z satisfies 0.3≤z≤1.5.

3. A solid electrolyte of a lithium secondary battery, comprising the sulfide compound according to claim 1.

4. The solid electrolyte of a lithium secondary battery according to claim 3, wherein the solid electrolyte comprises a single phase constituted by a crystal phase of a cubic argyrodite type crystal structure.

5. The solid electrolyte of a lithium secondary battery according to claim 3, wherein the solid electrolyte has an average particle diameter (D50) of from 0.1 μm to 10 μm.

6. A method for producing the solid electrolyte according to claim 3, comprising mixing a compound containing lithium (Li), a compound containing phosphorus (P), a compound containing sulfur (S), a chlorine-containing compound, and a bromine-containing compound, and calcining the compounds under a stream of hydrogen sulfide gas ($H_2S$) at from 450 to 600° C. (material temperature).

7. A negative electrode for a lithium secondary battery, comprising the solid electrolyte according to claim 3, and a negative electrode active material.

8. The negative electrode for a lithium secondary battery according to claim 7, wherein the negative electrode comprises the negative electrode active material comprising carbon or silicon.

9. A positive electrode for a lithium secondary battery, comprising the solid electrolyte according to claim 3, and a positive electrode active material.

10. A lithium secondary battery comprising the solid electrolyte according to claim 3.

11. The negative electrode according to claim 7, wherein the solid electrolyte comprises a single phase constituted by a crystal phase of a cubic argyrodite type crystal structure.

12. A positive electrode for a lithium secondary battery, comprising the solid electrolyte according to claim 5, and a positive electrode active material.

13. A lithium secondary battery comprising the solid electrolyte according to claim 5.

14. The sulfide compound for a solid electrolyte of a lithium secondary battery according to claim 1 or 2, wherein the Young's modulus is 10 GPa to 32 GPa.

15. The sulfide compound for a solid electrolyte of a lithium secondary battery according to claim 1 or 2, wherein the Young's modulus is 18 GPa to 32 GPa.

* * * * *